(12) United States Patent
Arimilli et al.

(10) Patent No.: US 6,356,980 B1
(45) Date of Patent: Mar. 12, 2002

(54) METHOD AND SYSTEM FOR BYPASSING CACHE LEVELS WHEN CASTING OUT FROM AN UPPER LEVEL CACHE

(75) Inventors: Lakshminarayana Baba Arimilli; Ravi Kumar Arimilli; James Stephen Fields, Jr., all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,374

(22) Filed: Nov. 9, 1999

(51) Int. Cl.[7] .............................................. G06F 12/08
(52) U.S. Cl. ...................... 711/138; 711/122; 711/128; 711/133
(58) Field of Search ................................ 711/138, 122, 711/128, 133

(56) References Cited

U.S. PATENT DOCUMENTS

| | | | | |
|---|---|---|---|---|
| 5,493,668 A | * | 2/1996 | Elko et al. ................... | 711/130 |
| 5,572,700 A | * | 11/1996 | Hays et al. .................. | 711/139 |
| 5,625,793 A | * | 4/1997 | Mirza ........................... | 711/138 |
| 5,642,494 A | * | 6/1997 | Wang et al. ................. | 711/140 |
| 5,715,424 A | * | 2/1998 | Jesionowski et al. ......... | 714/24 |

* cited by examiner

Primary Examiner—Hiep T. Nguyen
(74) Attorney, Agent, or Firm—Casimer K. Salys; Bracewell & Patterson, L.L.P.

(57) ABSTRACT

A method and system for bypassing cache levels when storing data castout from an upper level cache provides a memory hierarchy that can selectively skip one more more intermediate levels when writing castout entries from a higher level cache based on a number of detected conditions. The intermediate levels may be bypassed when an intermediate cache level is busy, has an entry with an address conflict with the castout value, or may skip levels based on program control. The control providing the skipping selection may be driven by a detector that analyzes load/store operations of a processor in order to produce efficient operation under changing memory use conditions.

20 Claims, 5 Drawing Sheets

METHOD AND SYSTEM FOR BYPASSING CACHE LEVELS WHEN CASTING OUT FROM AN UPPER LEVEL CACHE

CROSS-REFERENCES TO RELATED APPLICATIONS

The present invention is related to the following applications filed concurrently with this application: U.S. patent application Ser. No. 09/436,375 entitled "METHOD AND SYSTEM FOR MAINTAINING ALLOCATION INFORMATION ON DATA CASTOUT FROM AN UPPER LEVEL CACHE" and U.S. patent application Ser. No. 09/436,376 entitled "METHOD AND SYSTEM FOR ALLOCATING LOWER LEVEL CACHE ENTRIES FOR DATA CASTOUT FROM AN UPPER LEVEL CACHE".

The present invention also relates to U.S. patent application Ser. No. 09/052,567 entitled "PROCESSOR AND METHOD OF PREFETCHING DATA BASED UPON A DETECTED STRIDE" filed Mar. 31, 1998 and assigned to the same assignee. The specification is incorporated herein by reference.

BACKGROUND OF THE INVENTION

1. Technical Field

The present invention generally relates to computer systems, and more specifically to an improved method of deallocating cache entries from an upper level cache used by a processor core of a computer system. In particular, the present invention makes more efficient use of a cache hierarchy by managing cache entries that are written to lower levels of cache after they have been modified.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure the integrity of data that may be operated on by multiple processes on multiple processors and potentially contained in multiple cache units. It is desirable to satisfy these objectives consistent with the further commercial objectives of increasing processing throughput, minimizing electronic device area and reducing complexity.

Both multiprocessor and uniprocessor systems usually use multi-level cache memories where typically each higher level is smaller and has a shorter access time. The cache accessed by the processor, and typically contained within the processor component of present systems, is typically the smallest cache. As such, the cache entries available at the highest level cache are often being reallocated. This is due to requests for new data and a need for space to store that data within the higher levels of cache memory. As new reads are performed up the levels of cache, locations must be deallocated or "freed" in order to make room for the new data. This is known as cache location "victimization" and the selected target to deallocate is known as the "victim".

If a cache entry is being deallocated and values within the entry have been modified, the cache entry is considered "dirty" and must not only be deallocated, but must be written or "flushed" to the lower levels in the to memory hierarchy in order to maintain coherency. In a multiprocessor system, the cache must not only be coherent with the lower levels, but different cache entries overlapping the same address may be loaded in to more than one processor's high level cache. This raises the complexity of a system that maintains the coherence of the entire memory hierarchy and impacts the design and operation of every level of the memory hierarchy.

A typical cache memory hierarchy contains a least-recently-used array (LRU). This array allows the cache controller to determine which entry to deallocate when a request for a new allocation is made. It has been found in the past that an efficient method for selecting the deallocated target is the deallocate the least recently used entry in the cache, based on the assumption that it has the lowest probability of being required again before another entry that has been more recently used. The deallocated entry must be written to a lower level of the memory hierarchy if it is "dirty". A typical cache hierarchy will then place this entry in the next lower level of cache memory and flag it as the most recently used entry (since it has just been accessed). If the new entry for which space is being allocated in the higher level has already been read from the next lower level cache (a desirable sequence since the read allocation is memory that is needed immediately or at least predictably soon by the core), then the deallocated entry after it has been flushed will have a position that is more recently used than a new read allocation. Under certain circumstances this may not be a desirable condition. Infrequently used memory locations may end up being preserved in intermediate levels of cache at the expense of deallocating and reallocating entries that are more frequently used.

In light of the foregoing, it would be desirable to provide a method of speeding up core processing by improving cache deallocation mechanisms, particularly with respect to the interaction of the mechanism with the cache hierarchy. It would be further advantageous if the method allowed a programmer to optimize various features of the deallocation mechanism.

SUMMARY OF THE INVENTION

It is therefore one object of the present invention to provide an improved processor for a computer system, having one or more caches in a memory hierarchy.

It is another object of the present invention to provide an computer system using such a processor, which also has one or more caches in the memory hierarchy.

It is yet another object of the present invention to provide a computer system and processor that make more efficient use of a cache hierarchy.

The foregoing objects are achieved in a method and apparatus for managing a multi-level memory hierarchy of a computer system, implementing the steps of receiving an allocation request in a higher level cache, selecting a target cache line, determining that the target must be written to a lower level of the memory hierarchy and based on that determination, skipping one or more levels of cache, writing the contents of the target to a lower level of cache that is not the next lower level of cache. The method and apparatus may further skip levels based on a value programmed into a register. The method and apparatus may perform the skipping operation only if a pattern of loads and stores is or is not detected. The skipping operation may be provided by a special instruction or instructions. The skipping operation may be performed when the next lower level cache is busy, when the next lower level has no available buffers, or when there is an address conflict between the target and an entry in the next lower level cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
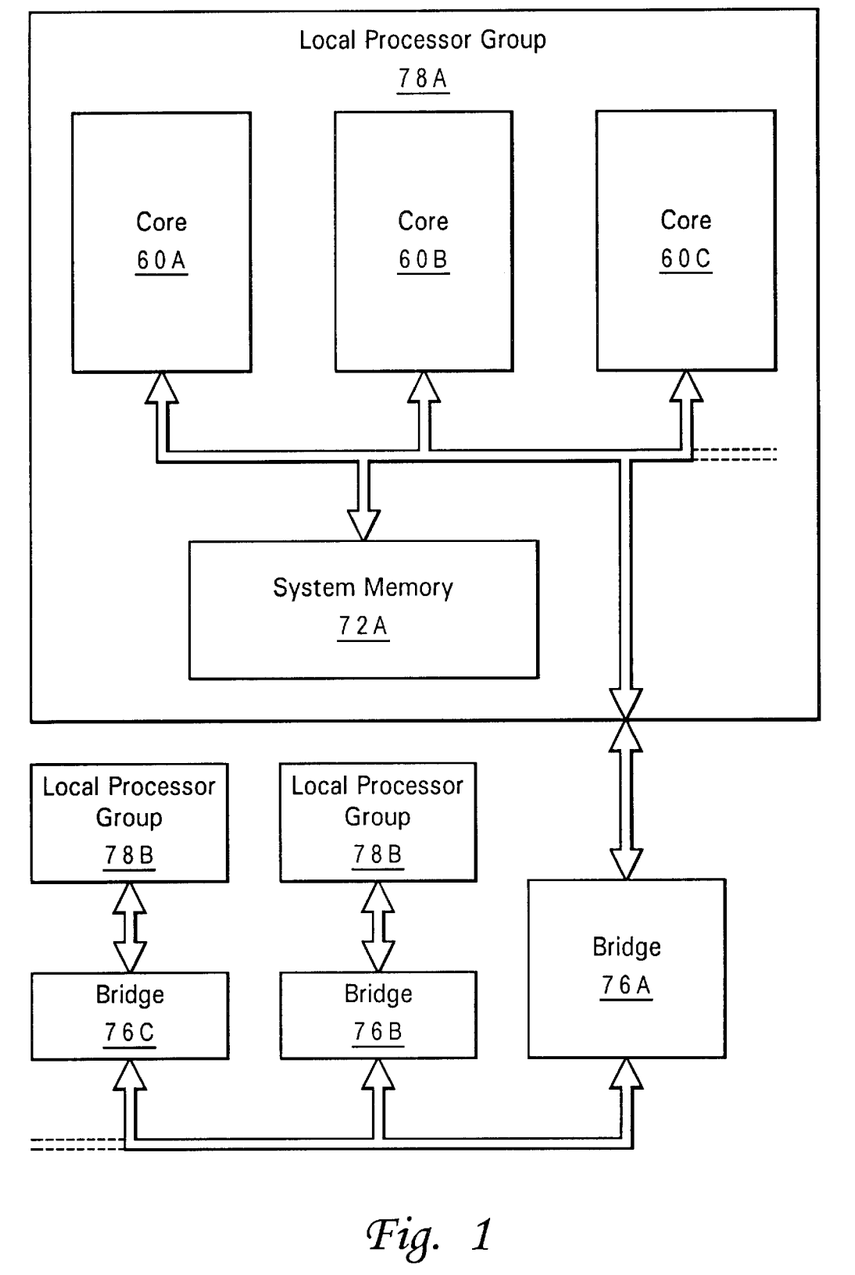
FIG. 1 is an electrical block diagram of a multiprocessor computing system in which the present invention may be practiced, depicting core execution units, system memory, buses and bus bridges.

With reference now to the figures, and in particular with reference to FIG. 1, a multiprocessor computing system is shown in which the present invention can be practiced. The computing system is a connection of local processor groups 78, that perform program operations. This arrangement is particularly useful for scalar mathematical operations such as array multiplication and inversion. Local processor groups comprise cores 60 that may contain caches or other local storage and the processor groups share a level of system memory 72A, that can be accessed by all of the processors in a group, and optionally by other local processing groups through bridges 76.

Figure 2:
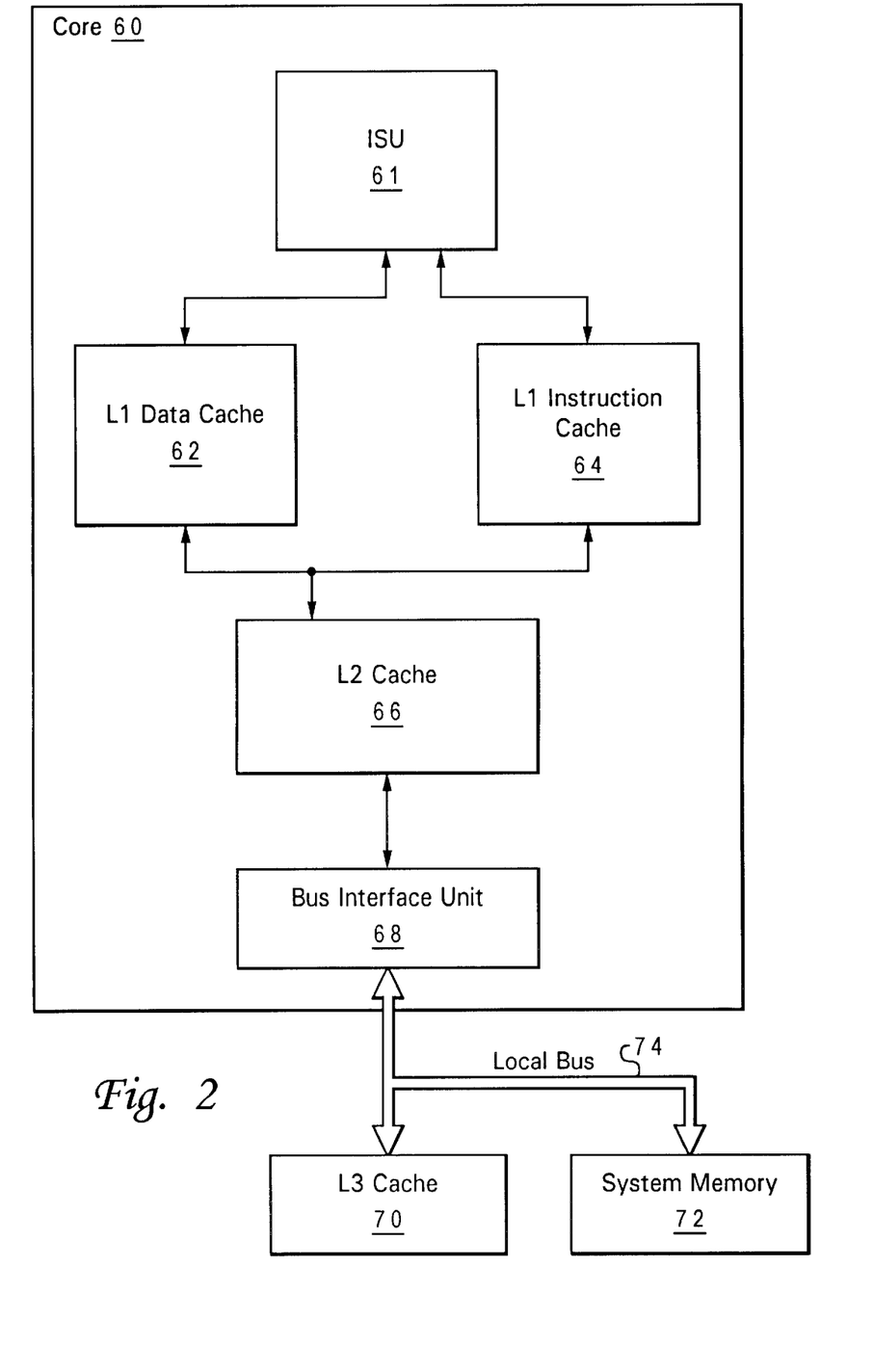
FIG. 2 is an illustration of one embodiment of a processor containing cache memories, in which the present invention can be practiced.

Referring now to FIG. 2, a processor core in which the present invention can be embodied 60 is shown. Core 60 contains other units not shown such as prefetch units, arithmetic logic units, etc. that are necessary and/or useful to the operation of core 60, but are not shown in this example. Instruction sequencer unit (ISU) 61 is coupled to two caches. L1 data cache 62 is used to store operand data, that is, values that are operated on by processor instructions. L1 instruction cache 64 is used to store instructions to be executed by ISU 61. L1 caches 62 and 64 are coupled to a single L2 cache 66 in this embodiment. Requests for operand data or instructions by ISU 61 cause read requests to L1 caches 62 and 64. If a value at the particular requested address is not present in L1 cache 62 or 64 (depending on whether an instruction or operand data is being loaded), a read request will be issued to L2 cache 66. Likewise if the value at the read address is not present in L2 cache 66, a read request is generated through bus interface unit 68 which is then carried on local bus 74 to L3 cache 70. The process continues down however many memory hierarchies are present, including page file operations from disk storage units.

When the read request is satisfied by L2 cache 66, L1 cache 62 or 64 will have to select a storage location for the read data. If all of the cache entries in L1 cache 62 or 64 are in use, which is typically the case after initial startup, a victim cache entry must be selected. If that entry has been modified in L1 cache 62 or 64, then the entry typically must be flushed to lower levels of cache. There are conditions under which the flushing of the entry might be avoided, related to operations by other cores 60, but under most conditions, the cache victim will be stored in a lower level of the memory hierarchy. Likewise, if L2 cache 66 did not contain the value for the read and had no free entries, then a victim would be selected in L2 cache 66 for storage of a value that would be read from L3 cache 70. If the value is likewise not present in L3 cache 70, a victim is selected in L3 cache 70 and the read would be made from system memory 72. L1 Cache 62 as well as other caches employ buffers so that requests for several reads and writes may be either queued or performed simultaneously without collisions when accessing the main cache data areas. The use of buffers for this purpose is well known. Another purpose for the buffers is to allow temporary storage of castout values by issuing a write request for the castout, prior to filling the castout's prior location with the read value. Without the buffer, the completion of the read would have to wait until the castout is written to the lower level cache's data area. The use of buffers allows the castout to be stored while the read (and requisite store into the higher level cache) is completed immediately. This is a more efficient structure for operating a memory hierarchy, as it reduces delays experienced by ISU 61 that will occasionally occur when a value that is needed has not been prefetched into either L1 Data Cache 62 or L1 Instruction Cache 64. Likewise, application of this technique between lower levels of cache reduce delays experienced by the cache controllers when satisfying read requests. The overall effect is that the data delay to ISU 61 is reduced because data is ready earlier on average.

The present invention is directed to a problem that occurs when using this type of cache read/write method with a cache memory. As the invention is directed toward transactions between two cache levels in a memory hierarchy, the terms higher level and lower level cache will be used to refer to any pair of levels within the memory hierarchy, as lookaside buffers and write-through caches are known to yield transactions between levels that are not adjacent. In addition, these transactions are not limited to caches but may extend to system memory and storage devices providing for the spooling of memory pages from system memory, or device memories such as a display device.

The cache memory is modified to optimize the placement of castout write values that are written to a lower level in the memory hierarchy. If the castout data is treated in the same way as read data being read into a cache from a lower level in the memory hierarchy, the write that stores the castout occurs subsequent to the read of the value requested. In a cache memory that does not embody this invention, an LRU unit will enter the castout as the most-recently-used entry. Since the castout was chosen as a victim in the upper level cache, in an efficient design that would be a value less needed than any other in the higher level cache. Additionally, the read request that was just made to transfer data from the lower level to higher level cache is data that is needed by the processor, at least statistically speaking. The data may be later unused due to speculative loading wherein caches are populated with entries based upon predictions of needed values that may not be actually used. The LRU entries are usually what determines victim selection in the cache, for example a cache might implement a victimization technique where the least recently used cache entry is always selected as a victim.

The present invention solves this problem by treating castout values in a different manner than values that are read from lower level caches. Several features are provided in core 60 that will ensure that castout data will receive less preference and persistence than new read data.

Figure 3:
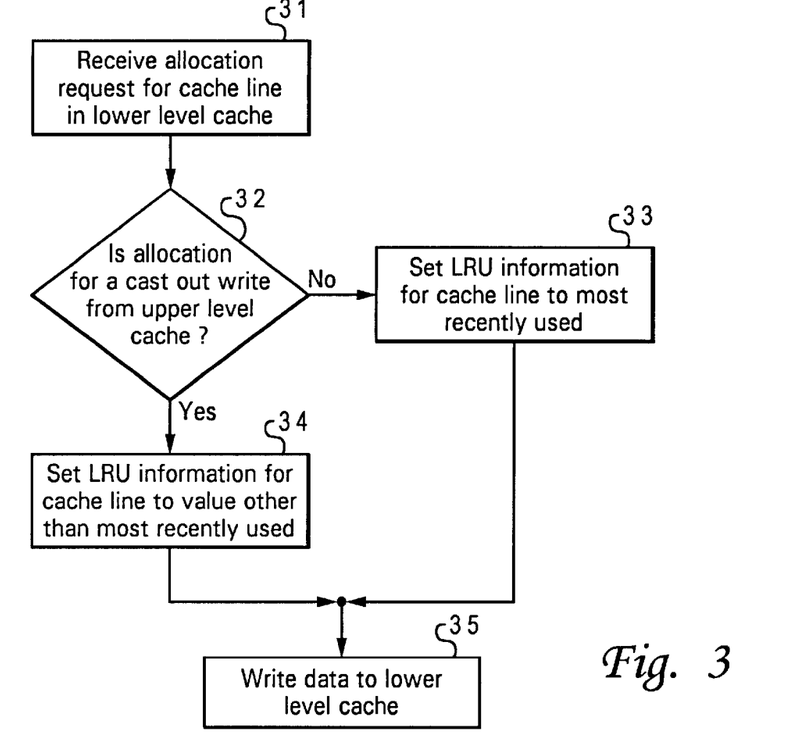
FIG. 3 is a flow diagram of one embodiment of a method of the present invention.

Referring now to FIG. 3, a method for managing the updating of a lower level cache with a castout write value is depicted in flow diagram form. When a lower level cache receives a request for an allocation of a cache line (step 31), the cache control decides whether the allocation is for a castout (decision 32). If the allocation is for a castout being written from the higher level cache, the information in the LRU corresponding to the cache entry is updated to a value other than most recently used (step 34) and the data is written to the lower level cache location (step 35). If the allocation is for a read from a level lower in the memory hierarchy, the LRU information is updated to indicate that this entry is now the most recently used entry (step 33), and the data is written to the cache entry (step 35). The LRU value that is used to mark the cache victims may be varied under program control by providing a programmable register within the lower level cache to set the LRU value that should be assigned to the castout write. As other castout allocations are made, the allocations for them are marked with this value and the other castout entries are marked with values indicating that they are even less recently used.

Figure 4:
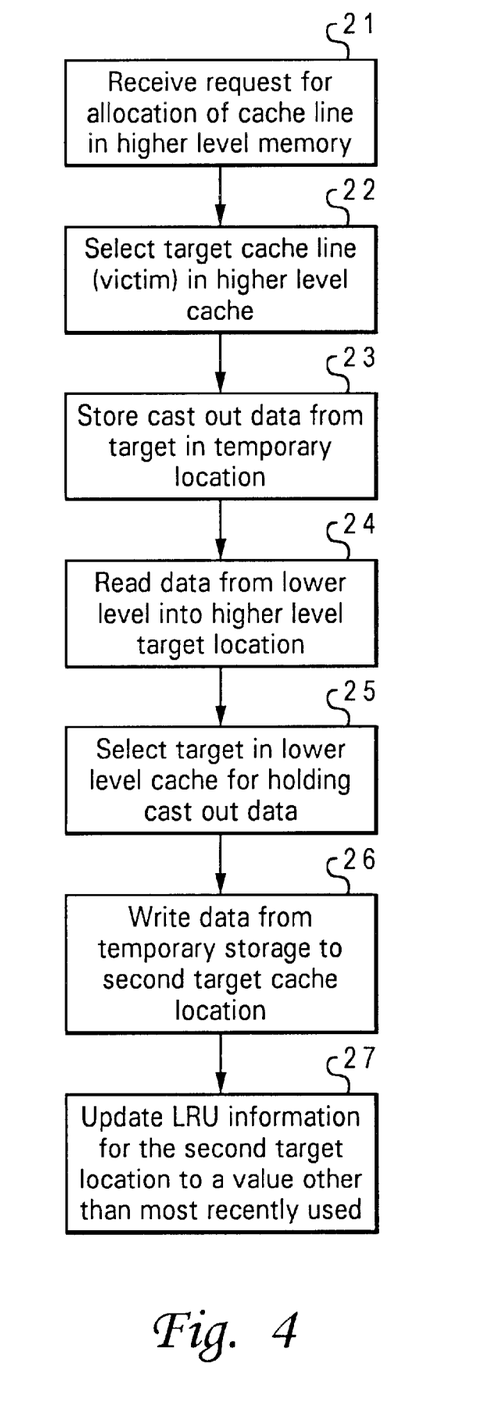
FIG. 4 is a flow diagram of another embodiment of a method of the present invention.

From the perspective of the higher level cache, a compatible method is shown in FIG. 4. The higher level cache receives a request for an allocation of a cache line to satisfy a read from a lower level in the memory hierarchy (step 21). Then, a victim is selected (step 22). The castout data from the victim location is then temporarily stored in a buffer (step 23) and data is read from the lower level cache into the victim location (step 24). Next, a victim is selected in the lower level cache to hold the castout data from the higher level cache victim (step 25) and the data is written from the buffer to the victim location (step 26). The LRU information in the lower level cache is updated to a value other than the most recently used value (step 27). This is essentially step 33 of FIG. 3, the difference being, from the perspective of this method, the allocation in the lower level cache is already known to be a castout from the higher level cache. While this exemplary embodiment is directed to caches using an LRU replacement algorithm, the invention is not limited to caches using LRU and can be applied to other cache replacement algorithms.

Figure 5:
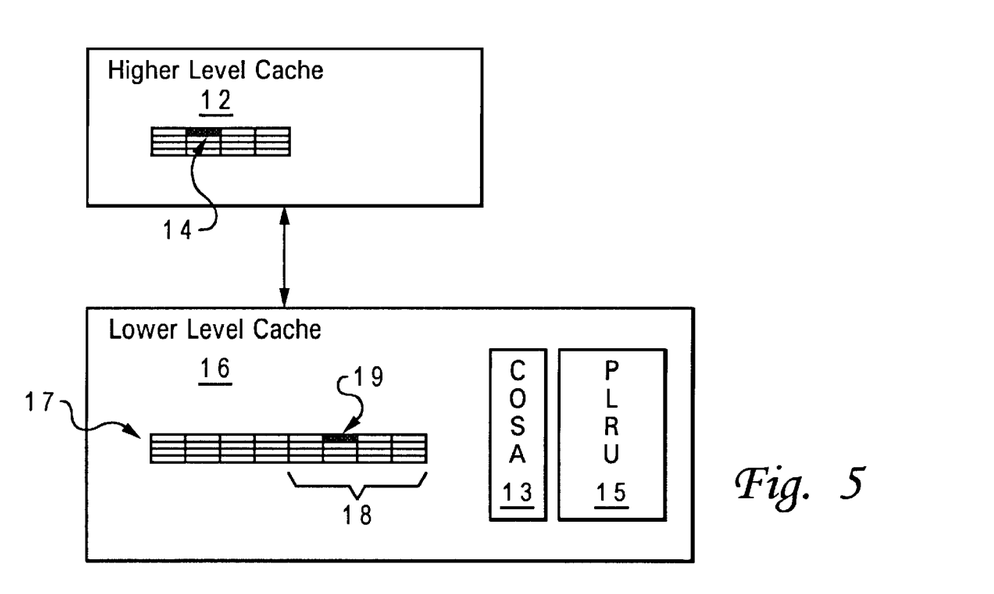
FIG. 5 is an electrical block diagram of a memory hierarchy in accordance with the present invention.

Another enhancement to core 60 involves the marking of cache entries in the lower level cache by means of an information array maintained in the lower level cache. Referring to FIG. 5, an exemplary connection of higher level cache 12 and lower level cache 16 is shown. Victim 14 is a location within higher level cache 12 which has been modified and must be stored at a lower level of system memory, in this example, within data area 17 of lower level cache 16. It is advantageous to store castout writes in subset 18 of lower level cache 16 at location 19. By itself, this may provide information that the location stores a castout from higher level cache, but is not a preferred means for storing information about the castout as this restricts the use of subset 18 to castout writes. The placement of the castout in location 19 may, however, provide lower level cache 16 with a performance advantage by preferentially selecting victims from subset 18. In this manner, castout writes can be selected as victims before entries that are for reads.

A preferred way of selecting castout writes as victims or treating them in a different manner as read entries, is to provide castout special array (COSA) 13. This array may be a single bit indication associated with entries in subset 18. This could allow subset 18 to encompass all of data area 17, and lower level cache 16 will still know that location 19 is a castout write by means of information in an associated entry in COSA 13. COSA 13 can also be an equivalent to psuedo-random least recently used array (PLRU) 15, for castout writes. PLRU 15 stores information about cache entries pertaining to the order in which they were least recently used. This information can be effectively segregated for castout writes by recording the information about the castout write usage in COSA 13. For example, a 3-bit COSA 13 can store the order of use of castout location 19 within a 4 set subset 18 and the third bit would indicate that a valid castout location 19 is present. Upon request for an allocation, lower level cache 16 can examine COSA 13 determine if any free entries are present in subset 18 and if not, examine the order stored in COSA to select a victim.

Figure 6:
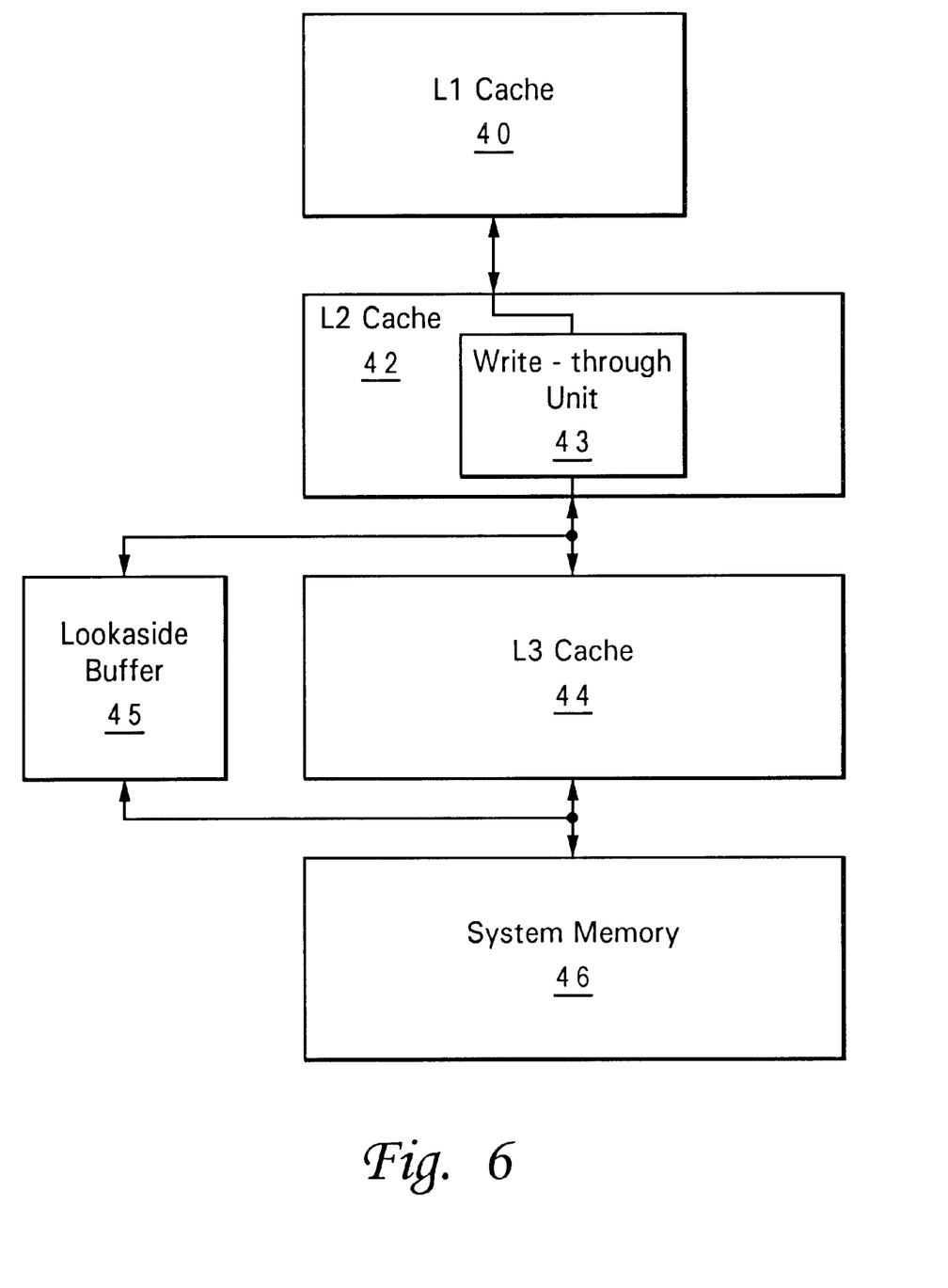
FIG. 6 is an electrical block diagram of a memory hierarchy in accordance with another embodiment of the present invention.

Another enhancement to core 60 involves the ability to selectively skip levels within the cache hierarchy for castout writes. Since there is a preference for maintaining read values at all memory levels and, under certain computing circumstances, a preference for keeping castouts out of the higher memory levels, it would be advantageous to skip levels in the memory hierarchy for castout writes. Referring to FIG. 6, an exemplary embodiment of the present invention is shown wherein L1 cache 40 is coupled to L2 Cache 42 and L2 cache contains write-through unit 43. Upon receiving an indication, L2 Cache can pass a cache entry write through to L3 Cache 44 which stores the value. Alternatively, L3 Cache 44, being coupled to lookaside buffer 45, may likewise pass a cache entry write to system memory 46. These are two mechanisms for skipping cache levels and the present invention extends to other mechanisms, provided they selectively skip levels in a memory hierarchy in response to determining that a cache allocation is for a castout write.

There are several ways in which an indication may be provided to a memory controller controlling a write to a particular memory level. The indication may be by means of a special controller instruction that indicates that the store is for a castout write, a programmable register may be provided to indicate the level should be skipped for castout writes, or the register may control the skipping function and may be programmed in response to knowing that the store is for a castout write. In addition, the skipping function may be controlled by an indication provided by a stride detector such as that disclosed in above related application 09/052, 567. This type of stride detection can be used to advantage by selectively skipping memory levels for castout writes when the stride detector has determined that the execution of core 60 is a technical application performing manipulation of large arrays of data. A technical application is generally found by a stride detector when repetitive scalar operations are performed such as matrix multiplication. When applications are using large arrays castout writes are frequently completely rolled out of lower levels of cache before they are used again, so it is desirable to skip memory levels on cast-out data writes when executing this type of application.

In general, any kind of hardware unit that can analyze patterns of memory access by either noting patterns in address accesses or the frequency with which location are accessed can be used as an input to create an indication that cache level should be skipped on a castout write.

The descriptors for the memory level itself may contain hints or directive bits that indicate a castout write from that level should skip the next lower level. For example, a page table entry may contain a bit indicating that on deallocation, the page should be deallocated to a lower level in the memory hierarchy after it has not been accessed recently. This has an advantage over write-through cache in that as long as the page is accessed frequently, the stores will keep the page in the higher level cache as a dirty page and the write-through will only occur after the accesses slow or stop. This is more efficient that an ordinary write-through. An indicator in a memory descriptor may be connected in operation to the hardware. For example, a machine instruction may provide for setting a bit in the directory entry upon deallocation which indicates that the deallocation should skip one or more levels, or an instruction may act directly to deallocate with a level skip.

Finally, skipping of memory levels may be performed in response to the state of the memory levels being skipped. For example, if the cache controller is busy, or if all of the temporary buffers used to store values being transferred between cache levels are full, or if there is an address conflict with an entry already present in the cache, such as a congruence class conflict, then the cache may provide an indication of one or more of these conditions, and the cache can be skipped if the write is for a castout from a higher level in the memory hierarchy.

While the above techniques apply to cache memories, and specifically, to a hierarchical cache memory structure in a super-scalar processor system, they are adaptable and contemplated to be useful in conjunction with other memory structures and other storage devices within a computer system. For example, the next lower level storage subsystem, which means further from the processor in terms of retrieval, may be a DASD (Direct Access Storage Device), or planar dynamic memory, as well as the cache of the illustrative embodiment. The upper level storage subsystem would be the storage subsystem closer in access to the processor, which in the illustrative embodiment includes the instruction and data caches.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for managing a multi-level in-line memory hierarchy including a higher level memory, a lower level memory and an intervening memory coupled between the higher level memory and the lower level memory, said method comprising:

receiving a request for an allocation of a cache line in the higher level memory;

selecting a target cache line in said higher level memory;

determining that values stored in said target cache line must be written to a lower level of said memory hierarchy; and     in response to said determining step:

transferring said values from said higher level memory to said intervening memory and from said intervening memory to said lower level memory; and         writing said values into the lower level memory without writing said values into the intervening memory.

2. The method of claim 1, further comprising the step of programming a register to provide a control indication, and said writing step is performed responsive to said determining step and further in response to said control indication provided by programming said register.

3. The method of claim 1, further comprising recognizing patterns of memory accesses to provide a control indication, wherein said writing step is performed responsive to said determining step and further in response to a result of said recognizing.

4. The method of claim 1, further comprising decoding an instruction containing a level skip control indication, wherein said writing step is performed responsive to said determining step and further in response to said level skip control indication detected by said decoding.

5. The method of claim 1, wherein said writing step is performed responsive to said determining step and further in response to said intervening memory being busy.

6. The method of claim 1, wherein said writing step is performed responsive to said determining step and further in response to said intervening memory having no available buffers.

7. The method of claim 1, wherein said writing step is performed responsive to said determining step and further in response to detection of a conflict between said target cache line and a cache line allocated in said intervening cache.

8. The method of claim 7, wherein said conflict is a congruence class conflict, and said writing step is performed responsive to said determining step and further in response to detection of said congruence class conflict.

9. The method of claim 1, and further comprising setting a software controllable hint indicator, wherein said writing step is performed responsive to said determining step and further based on a state of said software controllable hint indicator.

10. The method of claim 9, wherein said memory hierarchy is coupled to a processor, said method further comprising:

decoding a special deallocation instruction; and setting said software controllable hint indicator based on said special deallocation instruction.

11. A memory hierarchy for a computer system, said memory hierarchy comprising:

a higher level memory;

a lower level memory;

an intervening memory coupled between said higher level memory and said lower level memory, wherein said lower level memory is at a lower level of said memory hierarchy than said intervening memory; and     transfer control means for controlling transfer of data between memories in said memory hierarchy, said transfer control means having a write-through input, wherein said transfer control means, responsive to said write-through input, causes a cache line to be transferred from said higher level memory to said intervening memory and then to said lower level memory and to be written into said lower level memory without being written into said intervening memory, such that writeback of the cache line bypasses said intervening memory.

12. The memory hierarchy of claim 11, further comprising a programmable register for holding a value to control said write-through input.

13. The memory hierarchy of claim 11, and further comprising memory access pattern-detection means for detecting patterns of access within said memory hierarchy, wherein said pattern-detection means has an output coupled to said write-through input, such that writeback of said cache line from said higher level memory to said lower level memory bypassing said intervening memory is made responsive to the output of said pattern-detection means.

14. The memory hierarchy of claim 11, further comprising instruction decode means coupled to said write-through input for causing writeback of said cache line from said higher level memory to said lower level memory bypassing said intervening memory to be performed when a special store instruction is received.

15. The memory hierarchy of claim 11, wherein said intervening memory includes a busy output indicating that said intervening memory is busy, wherein said busy output is coupled to said write-through input, such that writeback of said cache line from said higher level memory to said lower level memory bypassing said intervening memory is performed when said next lower level is busy.

16. The memory hierarchy of claim 11, wherein said intervening memory includes a full output indicating whether said intervening cache has available storage, wherein said full output is coupled to said write-through input, such that said writeback of said cache line from said higher level memory to said lower level memory bypassing said intervening memory is performed when said intervening memory is full.

17. The memory hierarchy of claim 11, wherein said intervening memory includes conflict detection means for indicating that said next lower level currently has an allocation in conflict with a cache line being transferred from said higher level, wherein said conflict detection means is coupled to said write-through input, such that writeback of said cache line from said higher level memory to said lower level memory bypassing said intervening memory is performed when said conflict detection means detects a conflict.

18. The memory hierarchy of claim 17, wherein said conflict detection means detects congruence class conflicts.

19. The memory hierarchy of claim 11, wherein said write through input is provided by a software controllable hint indicator.

20. The memory hierarchy of claim 19, wherein said transfer control means comprises a controller that executes a special deallocation instruction that sets the state of said hint indicator.

* * * * *